Aug. 3, 1954
J. J. PROHASKA
2,685,518
SAUSAGE MANUFACTURING PROCESS
Original Filed Sept. 11, 1948
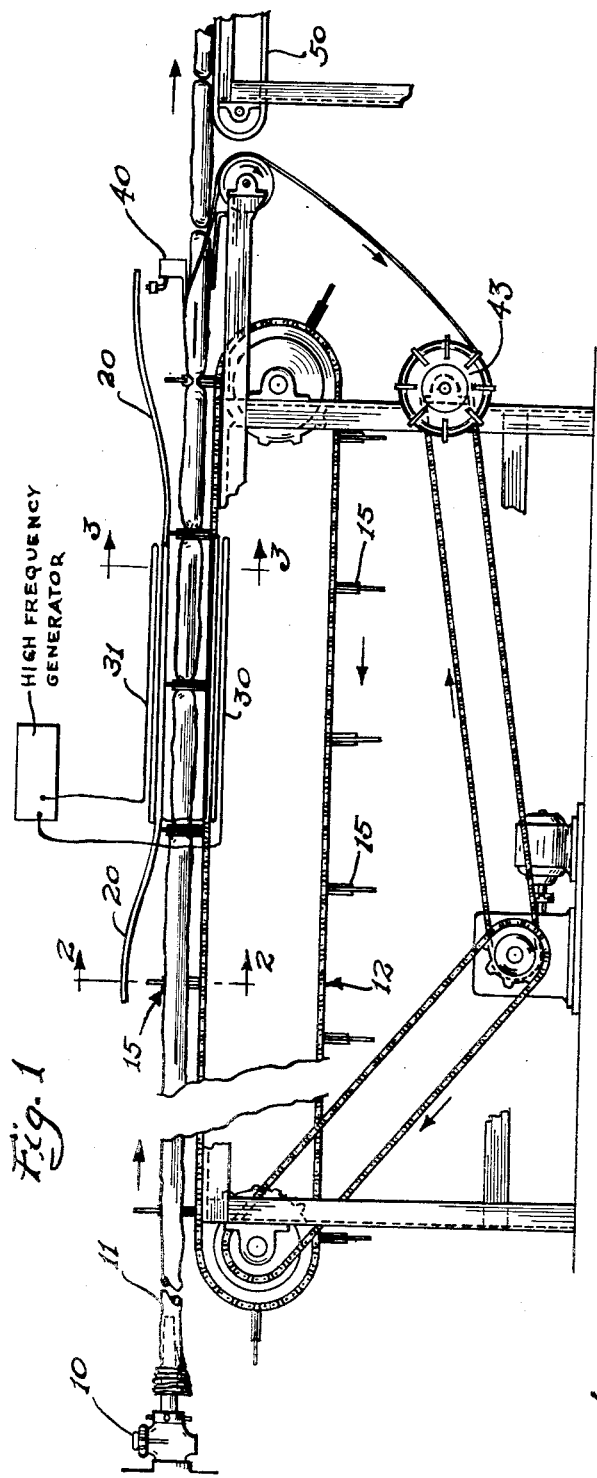
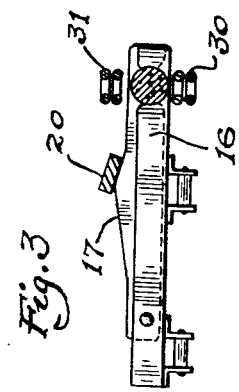
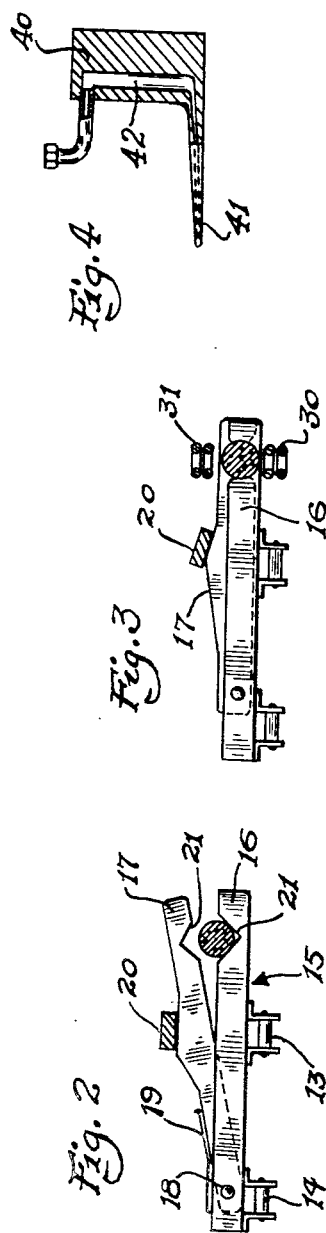
INVENTOR.
James J. Prohaska
BY
R. G. Story
ATTORNEY Patented Aug. 3, 1954

2,685,518

UNITED STATES PATENT OFFICE 2,685,518

SAUSAGE MANUFACTURING PROCESS

James J. Prohaska, La Grange, Ill., assignor to Swift & Company, Chicago, Ill., a corporation of Illinois Original application September 11, 1948, Serial No. 48,898, now Patent No. 2,623,451, dated December 30, 1952. Divided and this application April 2, 1952, Serial No. 280,041

8 Claims. (Cl. 99—109)

The present invention relates to a method of processing meat products, particularly those commonly referred to as skinless sausages.

The traditional method of making sausages has been to insert the comminuted sausage mixture into an animal casing, a process referred to as stuffing, and to slowly cook and smoke the sausage in a suitable enclosure. A description of these procedures may be found in the book "Sausage and Meat Specialties" (Part 3 of The Packers' Encyclopedia), published by The National Provisioner in 1938, the disclosure of which is included herein by reference.

Proper cooking and smoking of the sausages has three principal functions: first, it kills the bacteria, etc., which might otherwise be deleterious to the consumer and which might cause spoilage; second, it produces a color development to an extent that has become to be demanded by the public; third, it imparts to the comminuted mixture the desired flavor; and gives the product the texture familiar to the purchasing public. While the first of these three functions can be obtained by the application of a given amount of heat, with little regard to how it is applied, the second and third are greatly affected by the amount and speed of application of the heat and smoke. The exact details of amount and speed of application have often been closely guarded secrets. It is often dependent upon the skill and distinctive practices of a single individual in the processing plant, which skill and practices he has acquired by years of experience.

As a generalization, the cooking, which takes place in what is herein referred to in general terms as the "smokehouse," involves raising the temperature of the mixture in the casings up to about 160° F. over a period of about five hours. During at least a portion of this time wood smoke is introduced into the smokehouse to flavor the product.

In an effort to shorten the time one expedient has been to add an artificial coloring to the comminuted mixture before the casings are stuffed to compensate for the reduced color development ordinarily obtained by the historical process. When this is done the cooking time is reduced to around an hour and a half. This color will appear in the water when the sausages are subsequently cooked by the consumer. While taste is a matter of individual consideration, it is contended that the flavor development in a sausage so processed is not complete.

The principal object of the present invention is to provide a method whereby the processing time of sausages may be greatly reduced while at the same time retaining the advantages of the long cooking and smoking of the historical process.

A major advantage of the method of this invention is its adaptability to the preparation of "skinless" frankfurters. There has been a continually increasing demand for frankfurters which are not in casings, the so-called "skinless" frankfurter. These are produced by manufacturing the frankfurters in the usual manner and then stripping the casing from the contents before the product is packaged or sold. When this is done it is rather common to employ "artificial" casings. It will be apparent that the removal of the casings will add to the manufacturing costs of the skinless frankfurters.

Since the casing, whether "natural" or "artificial," is a substantial item of cost, there may be a significant saving if reusable, permanent molds may be employed. Such molds have been suggested in the past but apparently there has never been a notable commercial use made of such molds. The number required is the factor that has apparently prevented the adoption of the use of fixed molds. The present method permits the employment of permanent molds because of the fact that the comminuted mixture is only "set up" in the mold while the processing necessary to impart flavor and color to the comminuted mixture may take place after the "set up" mixture is removed from the mold. The number of molds required is reduced by a factor on the order of $1/1000$ of the number required when the total processing is done in the molds. However, as will hereinafter be described, the method may be employed with flexible casings which are not reused. The device I have devised and which is described herein employs the latter type of mold.

A further advantage of the invention is that the rapidity with which the temperature is brought up to about 130° F. greatly reduces the bacterial growth that occurs during the sausage manufacture. The temperature range between room temperature and about 130° F. is highly conducive to the growth of bacteria. In theory this is generally innocuous because the sausage is supposed to be raised to a final temperature sufficient to kill the bacteria. However, the smokehouse operators may err and not bring the sausage to a temperature sufficient to kill the bacteria. While this error may still occur, the present invention makes it less likely that the outcome will be serious because there are less bacteria present than there would be had the conventional practices been followed and a substantial period of time been taken in bringing the product up to 130° F., in which time the growth of bacteria would have been rapid.

The present application is a division of my prior application, Serial Number 48,898, filed September 11, 1948, now Patent No. 2,623,451.

It is an object of this invention to provide an improved process for manufacturing a sausage product.

It is another object of this invention to provide an improved process for molding and cooking a sausage product.

It is still another object of this invention to provide an improved process useful in a line for the continuous manufacturing of sausage products.

Another object of this invention is to provide a process useful in the manufacturing of skinless sausage products.

Another object of this invention is to provide a process for cooking a link sausage product without the conventional use of a casing.

Yet another object of this invention is to provide a process for setting up a sausage mixture prior to a smoking or cooking operation.

Other objects will appear from the specification below.

In the drawings:

Figure 1 is an assembly view of an apparatus adapted to perform this invention, partly broken away;

Figure 2 is a view taken on line 2—2 of Figure 1;

Figure 3 is a view taken on line 3—3 of Figure 1; and

Figure 4 is a side view partly in section, showing a plow arrangement for splitting the temporary mold or casing from the sausage product.

The sausage-making art is old and various aspects have been well developed. From the beginning, sausage makers have made use of some form of a container to hold the raw mixture while the product is being processed. Usually the container is left on the product and it serves to mold or hold the form of the product as well as protect the sausage until it is delivered to the ultimate consumer. Natural and artificial casings have been provided in the past for this purpose, and in some cases, in more recent times, the artificial casings have been stripped from the completed product prior to shipment to the consumer; for example, as in the production of skinless frankfurters. In following this last mentioned practice the products are manually skinned after the smoking and cooking operation has been completed.

The present-day procedures followed in the stuffing, linking, smoking, etc., during the manufacture of sausages include many additional operations that are largely manual. The various procedures have not heretofore been adapted to machine operations, and while there has been some improvement recently in the mechanization of the art, only a few of the proposed developments have been used, even in the largest commercial plants.

The present invention provides an improvement relating to the processing of sausages, wherein a skinless product may be made substantially continuously by machine operations, and it includes a procedure whereby a substantially raw sausage mix may be first molded to a desired shape and readied for a final cooking or smoking operation with no casing on the product. The practice of the present invention makes possible the attainment of improved results, not only in the savings realized in the mechanization of the production line, but also in the more uniform, faster, and better penetration of smoke and development of flavor than has been possible heretofore.

Briefly, this invention is concerned with a process for the manufacturing of at least partially cooked sausage products, and includes a step wherein the raw mix is molded to a desired form. The molded batch is then subjected to an electric cooking step during which the electric currents flowing within the batch uniformly heat up all portions of the mix simultaneously to produce cooking temperatures therein. In performing this operation, the discrete protein particles of the mix are partially coagulated so that they adhere together whereby to set the mixture. The heated mix is then stripped from the mold and the processing is continued, as by the conventional smoking or cooking procedure. The process may be adapted to continuous machine operations, which may be performed in several ways.

The preferred form of a machine to perform the method of this operation is shown in the drawings, and in using the machine, any conventional sausage mix is loaded into a stuffer. The mix may then be continuously extruded into a flexible tubular mold, and means are provided to crimp or squeeze the walls of the tubular mold together to form individual links as the filled mold progresses through the machine. After the linking step, the mixture in the mold is subjected to the effect of an electric current, as by passing the mixture through or adjacent an induction heating coil carrying a high frequency current, or flowing a current through the mixture from electrodes in contact with the meat mixture, so that the mix is at least partially cooked and set. The cooking of the mixture may be completed at this stage, but it need be only partially cooked to make the mixture take a self-sustaining form. After this heating and cooking operation has been completed the mold is stripped from the mixture so that the welded mass may be passed on to the further processing steps. The electric cooking operation can be performed in a matter of seconds, depending upon the power input, and thus the molding, linking, and cooking operations can be performed so rapidly as to continuously utilize the production from the normal stuffing operation. As above explained, after the mold has been stripped from the set mixture, the adherent mass of meat particles, having the usual link form, may be placed on a suitable conveyor for passage through a further cooking or smoking operation.

A mechanism to accomplish all of these operations is shown in Figure 1, wherein a stuffer 10 is positioned to forcibly issue the raw mixture into the generally tubular flexible mold 11. This mold may take the form of an artificial cellulose casing, and the stuffing operation may be rapidly performed as is now done in large-scale commercial operations. The filled casing is then passed to an endless conveyor mechanism generally denoted 12, which is preferably formed of a pair of sprocket chains 13 and 14 arranged in a parallel relationship and which passes over suitably driven sprocket wheels.

A plurality of pincerlike devices 15 is mounted across the two conveyor chains 13 and 14 (see Figures 2 and 3) and each of the pincers is formed of a pair of cooperating levers 16 and 17 which are pivotally connected together at 18. The lever 17 is normally biased to an open position with respect to the relatively fixed lever 16 by leaf spring 19, but a cam 20 is adapted to engage the upper lever 17 to drive lever 17 from the open position shown in Figure 2 to the closed position shown in Figure 3. Each of levers 16 and 17 has a V-shaped slot 21, formed at the outer end to engage around the stuffed casing, and as the levers 16 and 17 are closed together, the walls of the filled flexible mold are squeezed together to form or divide the sausage mix into individual links.

As the pincers carry the linked casing forwardly with the conveyor chains, the raw sausage mix in the casing is delivered to an electric cooking means which, in the preferred form, takes the form of a coil having sections 30 and 31 disposed on opposite sides of the molded mix. The coil is connected into a high frequency alternating current circuit, and when the sausage product is delivered into the electrical field of the coil, the current flow induced in the product begins to heat it up uniformly throughout the mass. The mix is maintained in the electric field until the desired temperature and degree of cooking have been accomplished; and at any time after a sufficient coagulation has been produced to set the mixture, the mold may be moved from the field of the coil.

After completion of this coagulating operation, the pincher elements 15 move to the outlet end of the cam 20 so that the lever 17 opens up with respect to lever 16. As soon as the levers are wide open, the product passes to a stationary plow 40 having a rather long, thin nose 41 that is adapted to be forced into a position between the set mixture and the surrounding casing as the conveyor delivers the product forwardly whereby to split the casing as it is pulled over the plow. The plow, as shown more particularly in Figure 4, has an air passage 42 passing through the body of the plow and extending lengthwise through the nose 41 so that air may be blown into the casing to strip it from the sausage. The air flow puffs up the flexible mold so that it is freed from the set meat mass to ensure the proper positioning of the plow under the casing, and as the casing is pulled forwardly over the plow it is split and stripped from the individual links. The split casing material passes downwardly and is wrapped around a reel 43 which is driven to provide tension for drawing the casing over the plow to aid in the splitting thereof. As the casing or mold is peeled from the set links of sausage product, the links fall onto an endless conveyor 50 for delivery to the smoke oven for further processing steps.

In the apparatus described above, the tubular mold is preferably formed of the conventional cellulose casing or any similar flexible material having a relatively high electrical resistivity. The casing is preferably formed of a flexible type of material so that it may be easily pinched in to form the individual links, but it is obvious that a closable form of mold having a more rigid structure that could be used over and over again might be adapted to the purpose of this invention. Any type of mold for dividing the raw mix into individual links and holding the mix shaped properly until it can be subjected to the described magnetic field would serve the purpose of this invention. It is essential that the mold, no matter what its form, has the electrical characteristic of a higher electrical resistivity than the sausage mix itself.

The pincher devices 15, mounted on conveyors 13 and 14, should likewise be formed of a material having a high resistivity characteristic. These members may be formed of stiff Bakelite, or the like, and combined with the mold to effect application of the electrical currents to the mix whereby it takes a more or less permanent set.

The electrical characteristics of a raw sausage meat mix are such that it has a relatively low resistivity, and when the mix is placed in a rapidly changing electrical or magnetic field, electrical currents tend to flow through the mixture. Thus, as the coil elements 30 and 31 are energized by being connected to a high frequency alternating current supply, and when the raw mixture in its mold is passed into the magnetic field of the coil, a current flow is induced in the product. When the current flow takes place, energy is delivered to the meat mixture so that an even, uniform cooking throughout the mass takes place. A similar cooking could, of course, be accomplished by subjecting the mixture in the mold to conductance heating by placing electrodes in direct contact with the raw mix or more slowly by placing the mold in a suitable condenser circuit, although it is to be noted that the last mentioned condenser heating means is very inefficient.

Any conventional frankfurter mix serves well as an example of a sausage product that may be worked through this process. The cooking temperature for such raw sausage mixes containing fresh meat may vary between 130° F. to about 160° F. In the preferred manner of performing this invention the raw frankfurter mixture is maintained in the magnetic field until a temperature of 130° F. is produced throughout the mass, and then the frankfurter links are withdrawn from the electric heating means. This is sufficient to set up the mixture without completing the cooking, although it is apparent that complete cooking could be accomplished if desired. It is preferred, however, that only partial cooking be performed and that the remainder of the cooking be done at other stages of the processing in order to more fully develop the flavor of the frankfurter during the smoking process which follows.

By this method there is a two-step cooking as compared to the conventional single-step process. In the first step the comminuted mixture is "set up" and brought to a temperature of about 130° F. In the second stage the temperature is raised from about 130° F. to about 160° F., and this is done at about the same rate of temperature rise as was employed in the conventional practice. By reducing to about one minute the time formerly required to raise the temperature of the comminuted mixture from room temperature to 130° F., at a slow rate of temperature rise, and continuing the temperature rise from 130° F. to 160° F. at the same rate of increase as previously employed, the over-all processing time is greatly reduced. Smoke may be added to the second stage of processing in the same manner as with conventional practices.

Furthermore, since the comminuted mixture has been set up at the end of the first stage it is possible to remove the product from the mold at this point. This permits the use of permanent molds without requiring an exhorbitant number to have one for each sausage that is being processed for the full processing time.

The electrical current supplied to the induction heating circuit must be somewhat higher than the conventional 60-cycle alternating current, since the heat developed in such a circuit is primarily a function of the frequency. It is preferred that higher frequencies be used in the range of above about 100 kilocycles. Approximately the same frequencies may be used in conductance heating, and in this instance a 2-ounce batch of frankfurter mix may be set in about one minute when approximately 225 watts are delivered to the heating circuit. With a higher power input the cooking can be accomplished much more rapidly. At 10 megacycles, the cooking of a 2-ounce link of a frankfurter mix has been accomplished in 12 seconds with sufficient power input.

When other types of heating circuits are used, the characteristic factors must be taken into consideration. With conductance or resistance heating, where the sausage mix forms the resistance, the heat developed is proportional to the power input, and the frequency must be taken into consideration only from the standpoint of the possibility of arcing at the electrodes and the occurrence of electrolysis within the meat mix. To avoid difficulties of this nature, frequencies within the higher ranges above about 100 kilocycles should be used. The upper frequency limit for induction heating is reached when there is a tendency to produce only surface heating. This, of course, is a known characteristic of induction heating, and the upper limit of the frequency varies, depending upon the diameter of the product being heated.

The batches of meat, as shown in Figure 1, are fed through the electrical heating means such as between the coil elements 30 and 31, with either a continuous or intermittent motion.

If the intermittent drive is used, the casing must dwell in the rapidly alternating electrical or magnetic field for a sufficient time period to accomplish the setting of the raw mix and, of course, a suitable slack must be provided between the continuous stuffer and the cooking means to coordinate the two steps. When a continuous flow through the field is used, the coil elements 30 and 31 must be extended lengthwise along the path of movement of the units of the molded product to ensure a sufficient period of movement within the field to produce the desired heating.

In the preferred operation of this invention the continuous operation is utilized and the mix begins to heat up uniformly throughout its mass as the molded batch passes into the field and it continues to cook as it moves forwardly. The length of the coil elements is designed in proportion to the speed of the conveyor so that a temperature of about 130° F. is produced in each link of the frankfurter product, for example, just as the links pass to a point beyond the field of the coil.

The method and apparatus described herein can be used with any type of sausage mix, such as frankfurter mix that is predominantly lean meat. The mixture is heated to effect at least partial coagulation of the protein material so that the discrete particles are at least partially coagulated so that they bond together. This forms a matrix to hold the molded shape of the mass. The presence of fat or other ingredients thus does not interfere with the set of the product when sufficient lean meat is present to produce the desired matrix. Partial coagulation of a frankfurter mix, such as is produced at a temperature of 130° F., sets the product so that the links can be easily handled through the remaining smoking and processing steps.

It has been proposed in the past to form a skin on the outside of sausage products, as by molding the raw mixture and subjecting the mold to hot water or steam. It has been noted that in this handling of a sausage mixture a matrix is not formed throughout the mass as when the cooking of the raw mixture is performed with an electrical current in the manner described above. Without the formation of a matrix throughout the mass the center portion remains soft and mushy. Such a product is not self-sustaining and breaks easily. Further, because of the formation of a coagulated outer skin, the product does not have a uniform texture, and also the relatively hard skin which must be formed to hold such a mass together interferes with smoke penetration and flavor development. All prior attempts to mold or set raw sausage mixes with hot water and steam have invariably failed in commercial operations because the skinned product so produced is not self-sustaining, because the tough skinned surface which must be produced can always be detected, and because the texture and flavor are not uniform.

When a product is set up with an electrical current, as distinguished from the forming of a skin on a product with hot water or steam or the like, a uniform texture can be produced therein without the development of a crust. There can be no overcooked skin on the individual links while at the same time a supporting matrix is produced in the mass to hold it together during the remaining processing steps.

Not only may the cooking be performed more rapidly in using electricity, but upon heating the mass evenly throughout, the bacteria, if any be present, are destroyed. Thus, in the manufacturing of a comminuted product where the possibility of infection with bacteria presents a constantly recurring problem, electrical cooking contributes to a more wholesome product not only in the more rapid handling of the product, which minimizes growth of bacteria, but also in that the uniform heating of the entire mass produces a more efficient killing of bacteria without destroying the texture of the product.

Due to the uniform texture produced in a frankfurter mix by 130° F. heat, the smoke penetration produced in the electrically cooked product is found to be more satisfactory. The use of a casing or the production of a skin on the surface of a product obviously tends to retard penetration of the smoke into the mass, and in the case where a skin formation takes place as in heating with water or steam, overtreatment of the skin usually takes place during the smoking so as to produce a crust. All of these difficulties are eliminated in following the present teaching.

From the description given above, the operation of this invention is evident. The desired mold is loaded, as here shown, by a conventional stuffing means, and the flexible mold is delivered sidewise through the open ends of the pincher arrangement 15 mounted on conveyor 12 so that it falls into the V-shaped slots 21. As soon as the casing is thus fitted into the pincher means, the pincers are closed to crimp and squeeze the walls of the casing together, and then the linked product is passed between the coil elements 30 and 31 to produce the desired cooking. As the product leaves the field of the coil, the pincers open up and the casing is moved sidewise and out of the open ends of the pincher means, whereupon the casing is split longitudinally by the plow 49 so that it may be stripped from links formed of the set mixture. The split casing is collected on reel 48, and as the reel is driven it takes up the casing to pull the remainder of the flexible cellulose casing over the plow to aid in the continuous skinning of the product coming from the electric heating station. As the set product passes beyond the plow 49 it falls onto a conveyor which delivers the individual links to the smoking or further cooking and processing operations.

The basic principles of this invention can be performed either on a continuous or intermittent cycle. The fundamental aspect of this invention is concerned with the electric cooking of a molded raw product to effect a setting of the mass. When a raw sausage mix is at least partially cooked to set it, as above described, a finished link results which has a more uniform texture and appearance than can be produced by any known technique.

It is suggested that many modifications may occur to those skilled in the art, which will fall within the scope of the following claims.

I claim:

1. The method of forming a self-sustaining skinless sausage ready for further processing from a sausage mix of a comminuted, meat-containing mixture of fluid consistency, said method including the steps of filling a mold of the desired shape with said mix, simultaneously heating substantially uniformly all portions, including both inner and outer portions, of said mixture in the mold to at least partially coagulate the protein to produce a set whereby the mixture has a self-sustaining form, and separating the self-sustaining, formed mixture from the mold.

2. The method of manufacturing a sausage from a comminuted mixture containing meat, including the steps of molding a given mass of the mixture to the desired shape, intensely heating substantially uniformly all portions, including both inner and outer portions, of said mass simultaneously to at least partially coagulate the protein to quickly produce a permanent set throughout the mass, and slowly completing the cooking of the sausage.

3. The method of manufacturing a sausage from a comminuted mixture containing meat by using a sausage mold, including the steps of filling said mold with a given mass of said mixture, electrically heating substantially uniformly all portions, including both inner and outer portions, of said mass simultaneously to at least partially coagulate the protein to quickly produce a permanent set throughout the mass, removing said set mass from the mold, and slowly completing the cooking of the sausage.

4. The method of manufacturing a sausage from a comminuted mixture containing meat including the steps of molding a given mass of the mixture to the desired shape, intensely heating substantially uniformly all portions, including both inner and outer portions, of said mass simultaneously to a temperature of about 130° F. to at least partially coagulate the protein to quickly produce a permanent set throughout the mass, and slowly completing the cooking of the sausage.

5. The method of manufacturing a sausage from a comminuted mixture containing meat, including the steps of molding a given mass of the mixture to the desired shape, intensely heating substantially uniformly all portions, including both inner and outer portions, of said mass simultaneously to a temperature of about 130° F. to at least partially coagulate the protein to quickly produce a permanent set throughout the mass, slowly completing the cooking of the sausage, and smoking the sausage.

6. The method of manufacturing a sausage from a comminuted mixture containing meat by using a sausage mold, including the steps of filling said mold with a given mass of said mixture, electrically heating substantially uniformly all portions, including both inner and outer portions, of said mass simultaneously to a temperature of about 130° F. to at least partially coagulate the protein to quickly produce a permanent set throughout the mass, removing said set mass from the mold, and slowly completing the cooking of the sausage.

7. The method of manufacturing a sausage from a comminuted mixture containing meat by using a sausage mold, including the steps of filling said mold with a given mass of said mixture, electrically heating substantially uniformly all portions, including both inner and outer portions, of said mass simultaneously to a temperature of about 130° F. to at least partially coagulate the protein to quickly produce a permanent set throughout the mass, removing said set mass from the mold, slowly completing the cooking of the sausage, and smoking the sausage.

8. The method of forming a self-sustaining skinless sausage ready for further processing from a sausage mix of a comminuted, meat-containing mixture of fluid consistency, said method including the steps of filling a mold of the desired shape with said mix, simultaneously heating substantially uniformly all portions, including both inner and outer portions, of said mixture in the mold to a temperature of about 130° F. to at least partially coagulate the protein to produce a set whereby the mixture has a self-sustaining form, and separating the self-sustaining, formed mixture from the mold.

References Cited in the file of this patent

UNITED STATES PATENTS

| Number | Name | Date |
|---|---|---|
| 1,009,953 | Boyle | Nov. 28, 1911 |
| 1,900,573 | McArthur | Mar. 7, 1933 |
| 2,182,211 | Paddock | Dec. 5, 1939 |